US011231791B1

(12) United States Patent
Jentz et al.

(10) Patent No.: US 11,231,791 B1
(45) **Date of Patent: *Jan. 25, 2022**

(54) HANDHELD CONTROLLERS FOR ARTIFICIAL REALITY AND RELATED METHODS

(71) Applicant: Facebook Technologies, LLC, Menlo Park, CA (US)

(72) Inventors: Lorenz Henric Jentz, Seattle, WA (US); Chunli Chen, Seattle, WA (US); Khaled Boulos, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/092,001

(22) Filed: Nov. 6, 2020

Related U.S. Application Data

(63) Continuation of application No. 16/509,109, filed on Jul. 11, 2019, now Pat. No. 10,845,895.

(51) Int. Cl.

| | |
|---|---|
| ***G06F 3/0346*** | (2013.01) |
| ***G06T 19/00*** | (2011.01) |
| ***G06F 3/03*** | (2006.01) |
| ***G06F 3/0354*** | (2013.01) |

(52) U.S. Cl.
CPC .......... *G06F 3/0346* (2013.01); *G06F 3/0304* (2013.01); *G06F 3/03544* (2013.01); *G06T 19/006* (2013.01)

(58) Field of Classification Search
CPC .. G06F 3/0346; G06F 3/0304; G06F 3/03544; G06T 19/006
See application file for complete search history.

(56) References Cited

U.S. PATENT DOCUMENTS

| | | | |
|---|---|---|---|
| 7,683,883 | B2 | 3/2010 | Touma et al. |
| 9,804,693 | B2 | 10/2017 | Long |
| 2008/0084385 | A1 | 4/2008 | Ranta et al. |
| 2013/0057472 | A1 | 3/2013 | Dizac et al. |
| 2017/0139481 | A1 | 5/2017 | Long |
| 2017/0205879 | A1 | 7/2017 | Joseph et al. |
| 2019/0033992 | A1 | 1/2019 | Morier et al. |

OTHER PUBLICATIONS

Woods et al., "MagicMouse: an Inexpensive 6-Degree-of-Freedom Mouse", Proceedings of the 1st International Conference on Computer graphics and interactive techniques, Feb. 11-14, 2003, 2 pages.
Chen et al., "Controller", U.S. Appl. No. 29/641,271, filed Mar. 20, 2018, 27 pages.
Non-Final Office Action received for U.S. Appl. No. 16/509,109 dated Apr. 3, 2020, 25 pages.
Notice of Allowance received for U.S. Appl. No. 16/509,109 dated Jul. 27, 2020, 23 pages.

*Primary Examiner* — Peter D McLoone
(74) *Attorney, Agent, or Firm* — FisherBroyles, LLP

(57) ABSTRACT

The disclosed handheld controllers may include a multi-degree of freedom sensor module, a mouse module, and a switch. The mouse module may include a mouse sensor and a proximity sensor. The switch may be configured to activate the mouse sensor and deactivate the multi-degree of freedom sensor module when the proximity sensor indicates that the mouse sensor is proximate to a physical surface and to deactivate the mouse sensor and activate the multi-degree of freedom sensor when the proximity sensor indicates that the mouse sensor is not proximate to the physical surface. Various other related methods, systems, and devices are also disclosed.

20 Claims, 12 Drawing Sheets

100 106 118 118 110 126 114 112B 112A 102 132 124 108 104 122 116 134 120 130 128

HANDHELD CONTROLLERS FOR ARTIFICIAL REALITY AND RELATED METHODS

CROSS REFERENCE TO RELATED APPLICATION

This application is a continuation of U.S. patent application Ser. No. 16/509,109, titled "HANDHELD CONTROLLERS FOR ARTIFICIAL REALITY AND RELATED METHODS," filed on Jul. 11, 2019, the entire disclosure of which is incorporated by this reference.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
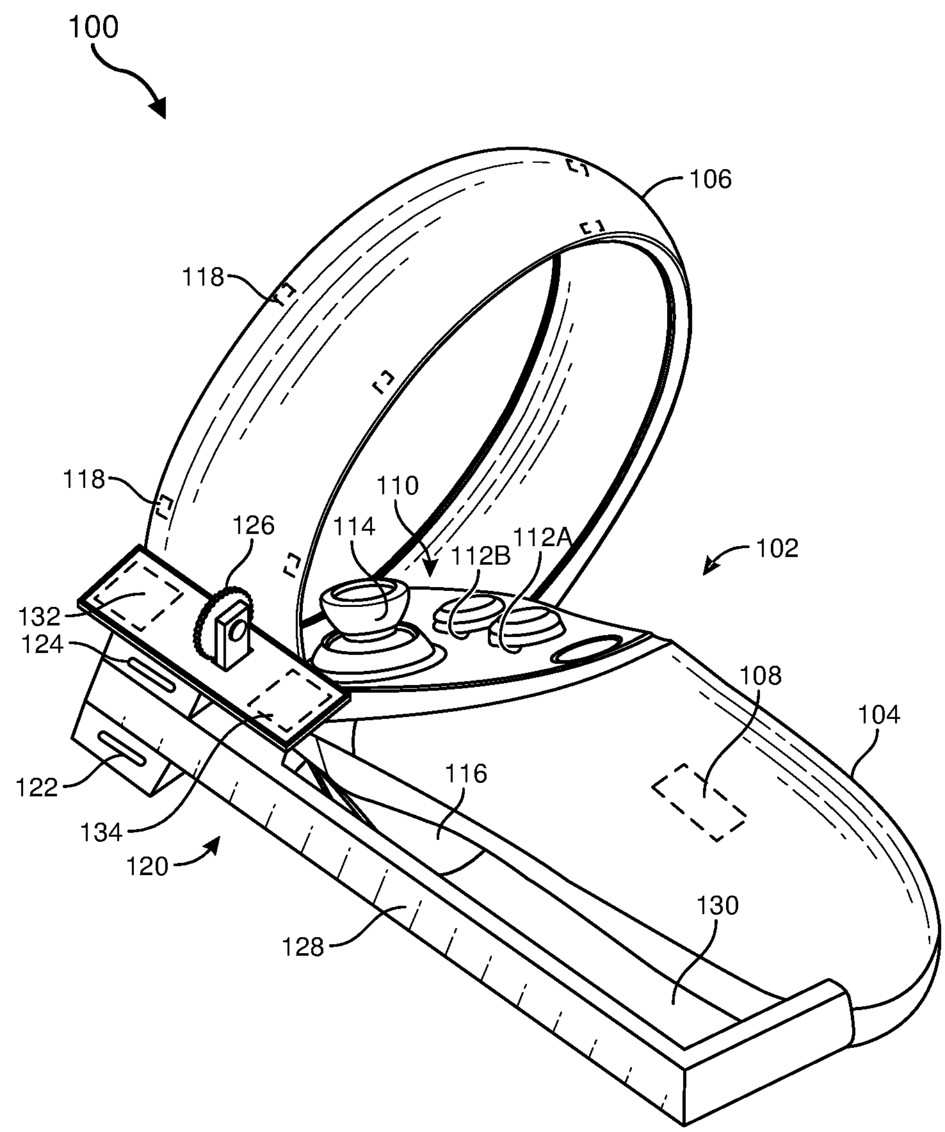
FIG. 1 is a perspective view of a handheld controller according to at least one embodiment of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

Artificial-reality systems, such as virtual-reality systems or augmented-reality systems, typically display computer-generated content (often via a head-mounted display ("HMD")) to users in order to create immersive experiences. For example, a virtual-reality system may create three-dimensional ("3D") renderings to simulate an environment or a virtual space. Alternatively, augmented-reality systems may merge computer-generated content with a user's view of a real-world environment to enhance interactions with the real-world environment. These systems may provide users with the ability to navigate and alter digital content that may provide helpful information about real-world objects.

Some artificial-reality systems are operated with a processor of a conventional two-dimensional ("2D") computing environment (e.g., a corresponding personal computer or server). Additionally, some artificial-reality systems include software applications for use in a 2D computing environment, such as a productivity environment (e.g., for word processing, emailing, viewing 2D videos and pictures, etc.). Users of such systems may switch between using the systems to access 3D and 2D content. Often, a handheld controller for a 3D computing environment is grasped and used in space, and a different controller (e.g., a typical computer mouse) is used in a 2D computing environment.

The present disclosure is generally directed to a handheld controller for artificial reality that includes a mouse module. As will be explained in greater detail below, embodiments of the present disclosure may include a mouse module that has a proximity sensor, so that when the mouse module is placed against a surface (e.g., a table), operation of the controller automatically switches to a mouse mode. In the mouse mode, one or more controller buttons may be used for left-click and right-click. When the controller is lifted from the surface, operation automatically switches back to a multi-degree of freedom ("multi-DOF") mode as in a typical artificial-reality controller. The mouse module may be ergonomically positioned on the controller to reduce or eliminate interference with operation in the multi-DOF mode, while also enabling comfortable use as a computer mouse. The mouse module may also enable fine controls for productivity environments in an artificial-reality system, with intuitive and automatic switching between the multi-DOF mode and mouse mode.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 2:
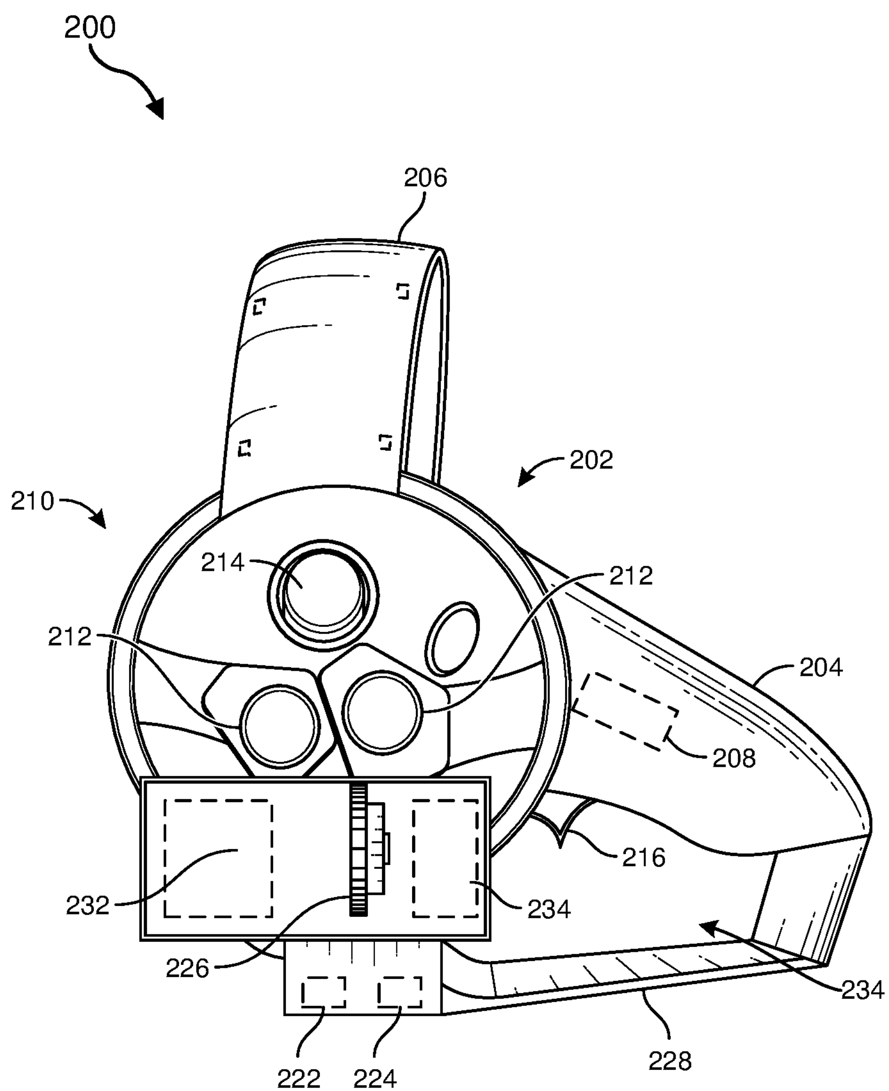
FIG. 2 is a side view of a handheld controller according to at least one additional embodiment of the present disclosure.
Figure 3:
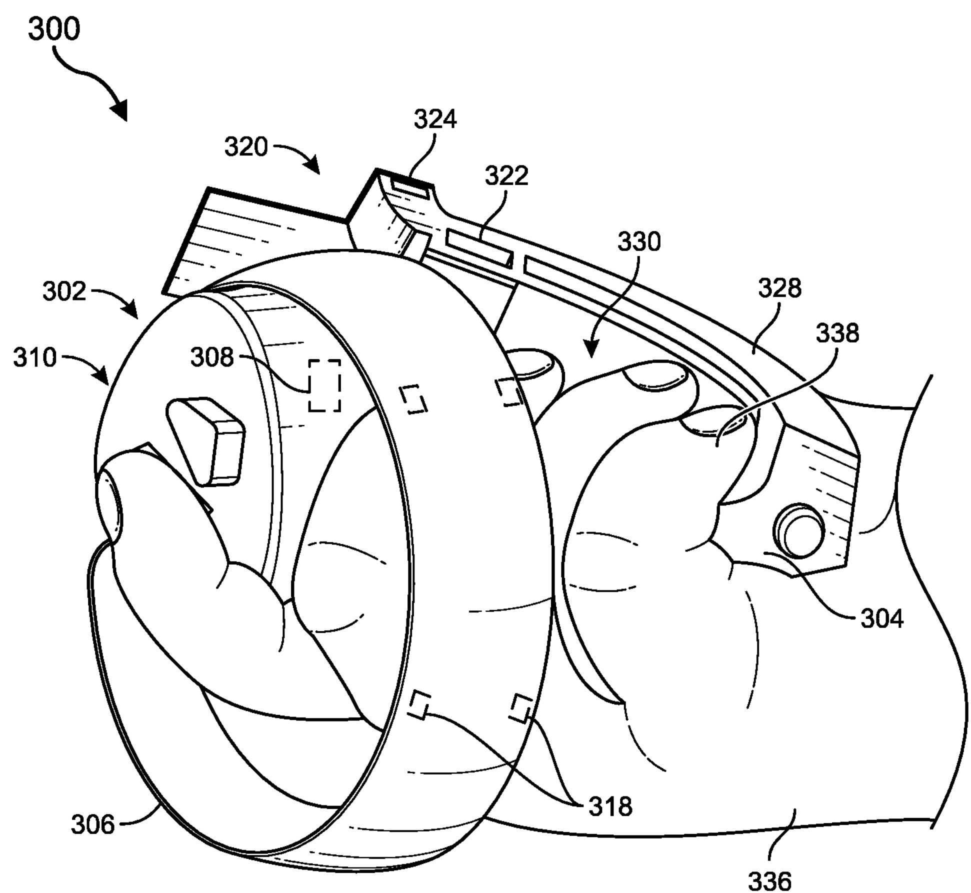
FIG. 3 is a perspective view of a handheld controller being held by a user's hand, according to at least one embodiment of the present disclosure.
Figure 4:
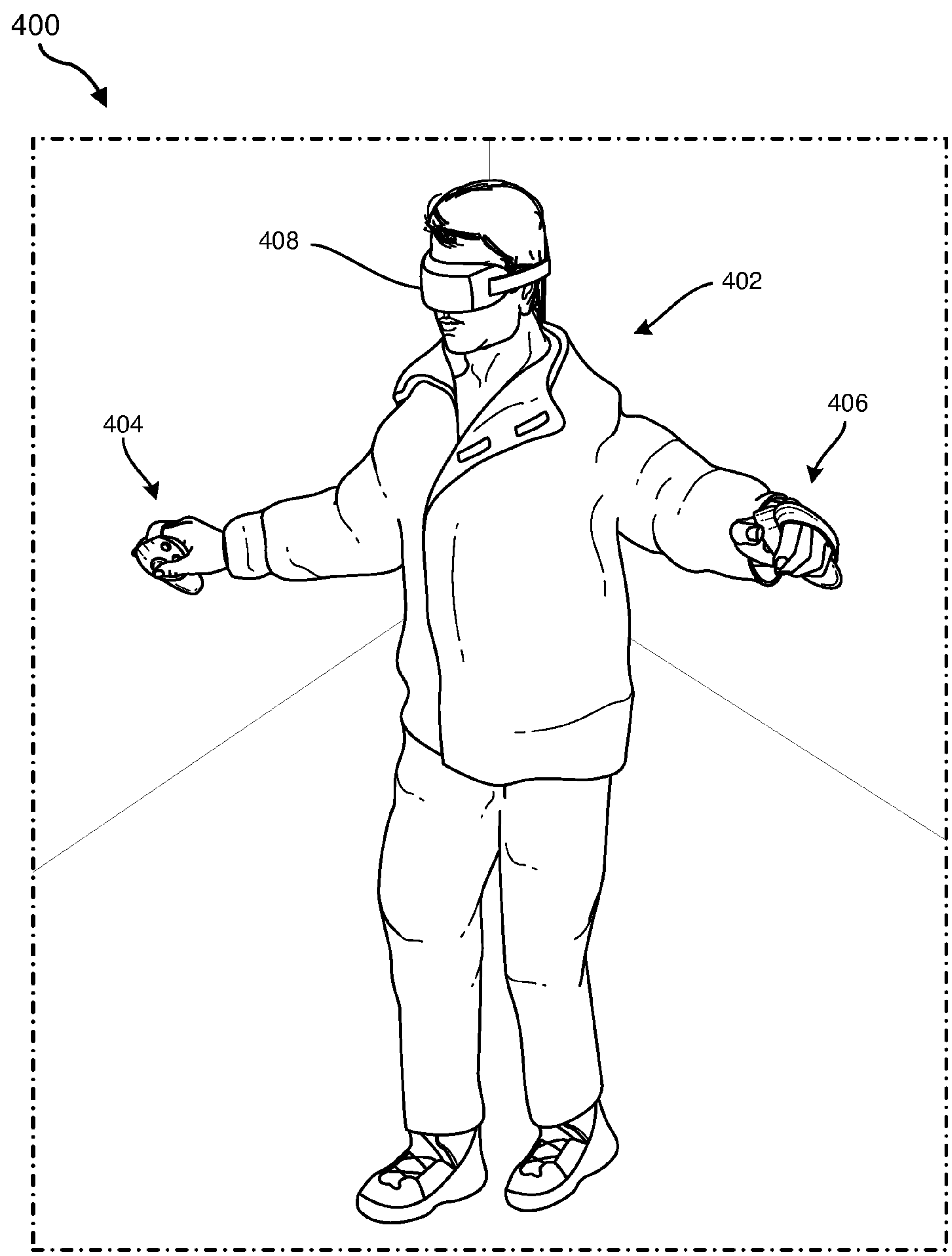
FIG. 4 is a representation of a space in which a handheld controller is being used by a user in a three-dimensional computing environment, according to at least one embodiment of the present disclosure.
Figure 5:
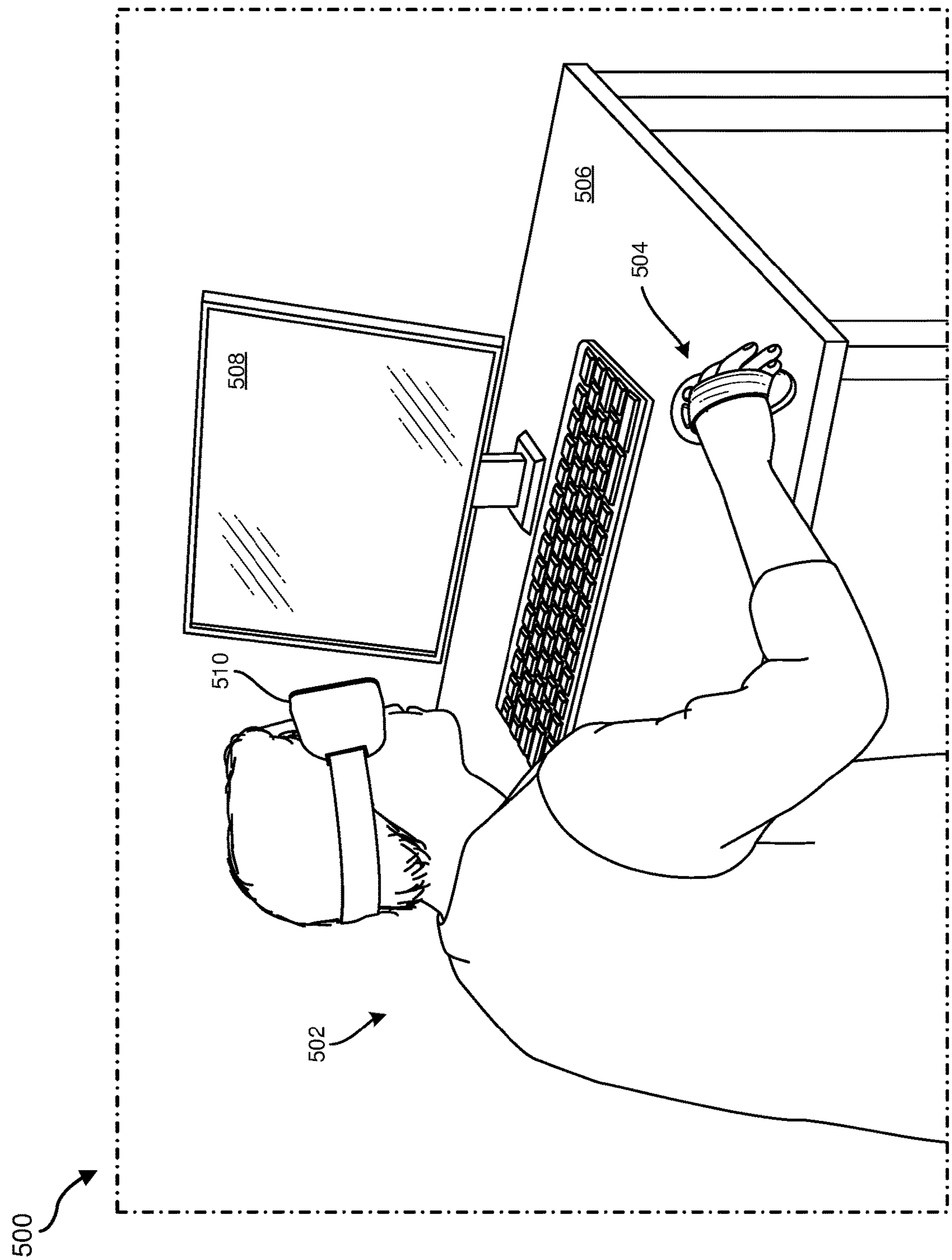
FIG. 5 is a representation of a space in which a handheld controller is being used by a user in a two-dimensional computing environment, according to at least one embodiment of the present disclosure.
Figure 6:
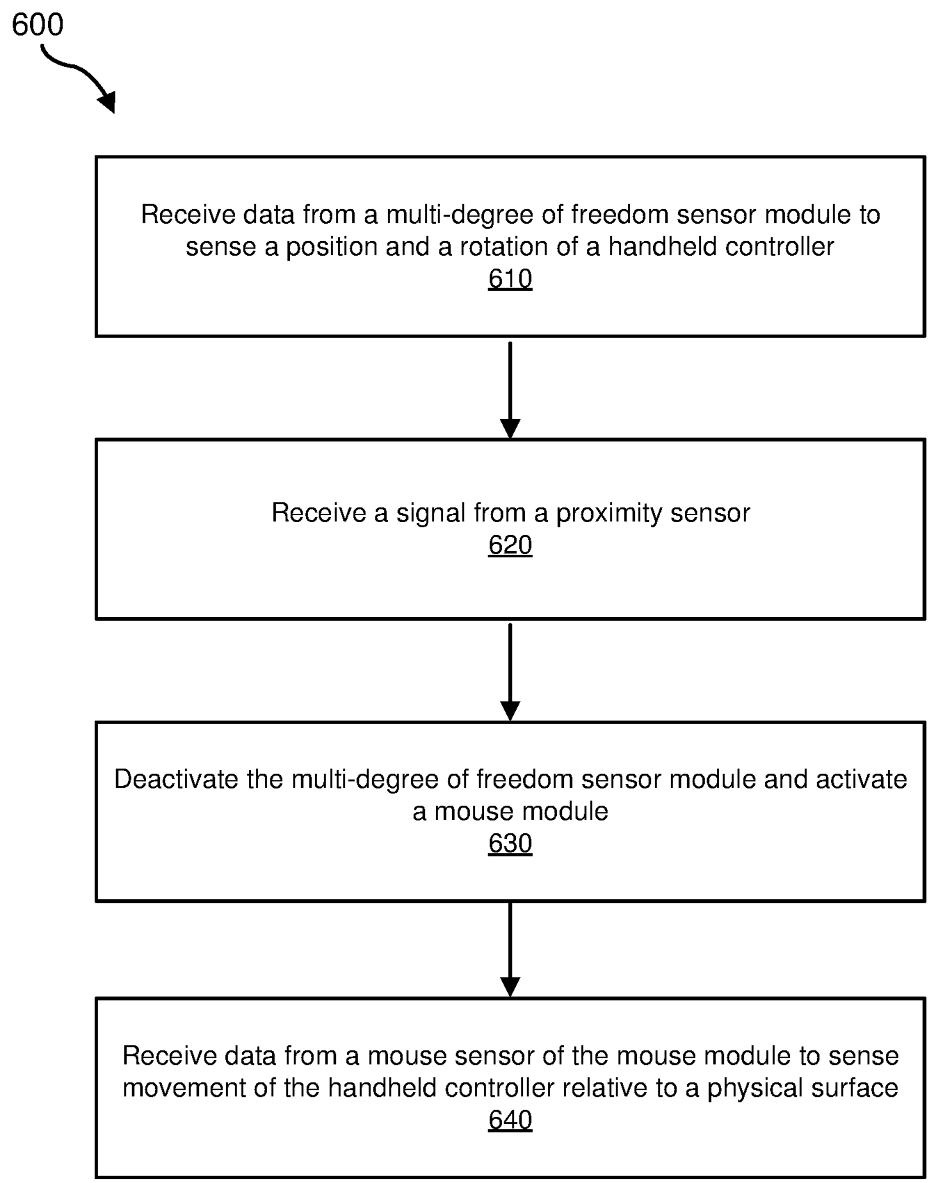
FIG. 6 is a flow diagram illustrating a method of receiving user inputs in a computer environment, according to at least one embodiment of the present disclosure.

The following will provide, with reference to FIGS. 1-3, detailed descriptions of various example handheld controllers according to the present disclosure. With reference to FIGS. 4 and 5, detailed descriptions of spaces in which a user may use handheld controllers in a 3D computer environment and in a 2D computer environment, respectively, will be provided. With reference to FIG. 6, detailed descriptions of an example method of receiving user inputs in a computer environment according to the present disclosure will be provided. With reference to FIGS. 7-12, detailed descriptions of various example artificial-reality devices, systems, and environments with which the handheld controllers of the present disclosure may be used will be provided.

FIG. 1 is a perspective view of a handheld controller 100 according to at least one embodiment of the present disclosure. The handheld controller 100 may include a controller body 102 from which a handle 104 and a surrounding ring portion 106 may extend. As shown in FIG. 1, the surrounding ring portion 106 may, for example, extend from a side of the controller body 102 to be positioned over the input buttons 112 and input thumbstick 114. The handheld controller 100 may also include a multi-DOF sensor module 108 configured to enable the handheld controller 100 to be utilized and operated in 3D space, such as for use in an artificial-reality (e.g., virtual-reality, augmented-reality, mixed-reality, hybrid-reality) environment.

The controller body 102 may support a number of input mechanisms 110. For example, the controller body 102 may support a first input button 112A and a second input button 112B (collectively referred to as "input buttons 112), an input thumbstick 114, and at least one input trigger button 116. The input mechanisms 110 may be positioned on the controller body 102 in locations to be manipulated by a user holding the handheld controller 100 by the handle 104. The handle 104 may be shaped and sized for grasping by the user. The handheld controller 100 may be in wired or wireless communication with a computing system, such as an artificial-reality computing system.

The multi-DOF sensor module 108 may include sensors for determining position, orientation, and/or movement information of the handheld controller 100. For example, the multi-DOF sensor module 108 may include one or more accelerometers and one or more gyroscopes. In some examples, the multi-DOF sensor module 108 may be a 6DOF sensor module configured to provide information (e.g., position, orientation, and/or movement) related to six degrees of freedom, namely: pitch; roll; yaw; forward and backward; upward and downward; and leftward and rightward. The surrounding ring portion 106 may include tracking elements 118, such as infrared light sources (e.g., infrared-emitting diodes), to further facilitate tracking (e.g., optically tracking) the position and/or orientation of the handheld controller 100 in 3D space.

The handheld controller 100 may also include a mouse module 120. The mouse module 120 may be configured to interact with a surface to determine a position thereof relative to a physical surface, as in a conventional computer mouse. For example, the mouse module 120 may include a mouse sensor 122 (e.g., an optical mouse sensor, a roller sensor, etc.) for tracking movement of the mouse module 120 relative to the physical surface. The mouse module 120 may also include a proximity sensor 124 for sensing when the mouse sensor 122 is near or against the physical surface. For example, the proximity sensor 124 may include an optical proximity sensor, a capacitive proximity sensor, a Hall effect sensor, a magnetic sensor, etc. In some embodiments, optionally, a scroll wheel 126 may be positioned on a side of the mouse module 120 in a location and orientation to be manipulated (e.g., rolled and/or clicked) by a finger (e.g., a thumb) of the user.

The mouse module 120 may also include a platform that is shaped and configured to rest against the physical surface when the mouse sensor 122 is proximate to the physical surface. The platform 128 may include at least one planar surface for resting against the physical surface. In some examples, the platform 128 may be shaped, positioned, and sized to support at least a portion of the handheld controller 100 on the physical surface, such as to maintain the mouse sensor 122 proximate to the physical surface when the handheld controller 100 is not held by a user. For example, the handheld controller 100 may be placed on a tabletop or other physical surface and supported thereon by the platform 128 of the mouse module 120. As shown in FIG. 1, the platform 128 may be shaped and positioned to form a gap 130 between the platform 128 and the handle 104, such that at least a portion of one or more of the user's fingers may be positioned within the gap 130 when the handle 104 is gripped by the user.

A switch 132 may be configured to activate the mouse sensor 122 and deactivate the multi-DOF sensor module 108 when the proximity sensor 124 indicates that the mouse sensor 122 is proximate to (e.g., placed against) the physical surface. The switch 132 may also be configured to deactivate the mouse sensor 122 and activate the multi-DOF sensor module 108 when the proximity sensor 124 indicates that the mouse sensor 122 is not proximate to (e.g., removed from) the physical surface.

Accordingly, the handheld controller 100 may be switched between a mouse mode in which the mouse sensor 122 is active and a multi-DOF mode in which the multi-DOF sensor module 108 is active by simply placing the mouse module 120 against a physical surface or lifting the mouse module 120 away from the physical surface. In the mouse mode, data from the mouse sensor 122 may be utilized, such as in a 2D (e.g., productivity) computing environment to move a cursor or other object. In some examples, one or more of the input mechanisms 110 (e.g., the input buttons 112) of the handheld controller 100 may be routed by the switch 132 to a left-click and/or right-click input of the mouse module 120. In the multi-DOF mode, data from the multi-DOF sensor module 108 may be utilized, such as in a 3D (e.g., artificial-reality) computing environment.

In some embodiments, the user may manually trigger the switching between the mouse mode and the multi-DOF mode, instead of or in addition to the proximity sensor 124 automatically changing the mode. For example, the user may select either the mouse mode or the multi-DOF mode by performing a specific interaction with one or more of the input mechanisms 110, an interaction with the scroll wheel 126, or a selection on a user interface (e.g., a computer screen, a head-mounted display screen, etc.). Thus, a user input that causes the switch 132 to alternate the handheld controller 100 between the multi-DOF mode and the mouse mode may include a manipulation of at least one mechanical input mechanism (e.g., one or more of the input mechanisms 110 or the scroll wheel 126), placement of the handheld controller 100 against a physical surface, and/or removal of the handheld controller 100 from a position against the physical surface.

In some embodiments, the mouse module 120 may be removable from and replaceable on the controller body 102. For example, the controller body 102 and multi-DOF sensor module 108 may be independently operable for use in a 3D computing environment with the mouse module 120 removed. If the user desires to use the handheld controller 100 for both a 3D computing environment and a 2D computing environment, or for only a 2D computing environment, the mouse module 120 may be positioned on and operably coupled to the controller body 102. The mouse module 120 may be physically (removably or permanently) coupled to the controller body 102 via one or more of a clip, magnet, compliant mechanism, bolt, screw, adhesive, etc.

Whether the mouse module 120 is permanently or removably coupled to the controller body 102, an electronic interface 134 may be used to operably couple the mouse module 120 to the controller body 102. For example, the electronic interface 134 may provide a wired or wireless connection to the switch 132 and/or to the multi-DOF sensor module 108. The electronic interface 134 may also electrically couple the mouse sensor 122 and/or the proximity sensor 124 to a power source in the controller body 102, such as a battery or a wired power source. In some examples, the electronic interface 134 may include a wireless communication module that may be configured to provide data from the mutli-DOF sensor module 108 and/or from the mouse module 120 to at least one processor that is configured for controlling the 3D (e.g., artificial-reality) computing environment and/or the 2D computing environment.

FIG. 2 is a side view of a handheld controller 200 according to at least one additional embodiment of the present disclosure. The handheld controller 200 of FIG. 2 may be similar to the handheld controller 100 of FIG. 1 described above. For example, the handheld controller 200 may include a controller body 202, a handle 204 and a surrounding ring portion 206 extending from the controller body 202, a multi-DOF sensor module 208, input mechanisms 210 (e.g., input buttons 212, an input thumbstick 214, an input trigger button 216, etc.), tracking elements 218 (e.g., infrared light-emitting diodes) positioned in or on the surrounding ring portion 206, and a mouse module 220 coupled to the controller body 202. The mouse module 220 may include a mouse sensor 222, a proximity sensor 224, a scroll wheel 226, and a platform 228. A gap 230 may be formed between the platform 228 and the handle 204. A switch 232 may be configured for alternating the handheld controller 200 between a mouse mode and a multi-DOF mode, such as in response to a signal from the proximity sensor 224. An electronic interface 234 may operably couple the mouse module 220 to the controller body 202.

In the example shown in FIG. 2, the surrounding ring portion 206 may extend and pass around a side of the controller body 202 opposite from the input buttons 212 and input thumbstick 214, rather than on a same side as the input buttons 212 and input thumbstick 214 (as shown in the embodiment of FIG. 1). The mouse module 220 may be positioned in this location on the controller body 202 to enable the handheld controller 200 to be held at a comfortable angle when the mouse module 220 is used against a physical surface.

FIG. 3 is a perspective view of a handheld controller 300 being held by a user's hand 336, according to at least one embodiment of the present disclosure. The handheld controller 300 may be similar to the handheld controllers 100 and 200 described above with reference to FIGS. 1 and 2. For example, the handheld controller 300 may include a controller body 302, a handle 304 for grasping by the user's hand 336, a surrounding ring portion 306, a multi-DOF sensor module 308, input mechanisms 310, tracking elements 318, and a mouse module 320 coupled to the controller body 302. The mouse module 320 may include a mouse sensor 322, a proximity sensor 324, a scroll wheel (not shown in the perspective of FIG. 3), a platform 328 for resting the mouse module 320 against a physical surface, and a gap 330 between the platform 328 and the handle 304.

As shown in FIG. 3, the gap 330 may be sized and shaped such that at least a portion of one or more fingers 338 of the user's hand 336 may be positioned within the gap 330. The platform 328 may, in some examples, include at least one planar surface for resting against the physical surface. As illustrated in FIG. 3, the platform 328 may have a non-linear shape within the plane of the planar surface, such as curved. The curved (or other non-linear) shape may be configured to provide a stable foundation for supporting the handheld controller 300 when placed against the physical surface, such as for use in a mouse mode. For example, when the handheld controller 300 is not held by a user, the platform 328 may support the handheld controller on the physical surface, with the mouse sensor 322 of the mouse module 320 maintained proximate to the physical surface. As further illustrated in FIG. 3, the mouse module 320 may be shaped, sized, and coupled to the controller body 302 in a fashion that does not interfere with use of the handheld controller 300 in a multi-DOF mode, while still enabling effective and comfortable use in the mouse mode.

FIG. 4 illustrates a space 400 in which a user 402 is using a handheld controller 404 according to the present disclosure in a 3D computer environment. Any of the handheld controllers 100, 200, 300 (e.g., having a mouse module) described above may be employed as the handheld controller 404. By way of example, the user 402 may hold the handheld controller 404 in a right hand, assuming the user is right-handed. In the other hand, another handheld controller 406, which may lack a mouse module, may be held. 3D visual content may be displayed to the user 402 on a head-mounted display 408 worn by the user 402. At least one multi-DOF sensor module of the handheld controllers 404, 406 may enable the user 402 to use the handheld controllers 404, 406 in space to interact with the 3D computer environment, such as to manipulate digital objects, make virtual selections, etc.

FIG. 5 illustrates a space 500 in which a user 502 is using a handheld controller 504 according to the present disclosure in a 2D computer environment. As described above, the user may place the handheld controller 504, which may include a mouse module, against a physical surface 506, such as a tabletop. In response, the handheld controller 504 may switch from a multi-DOF mode to a mouse mode. In the mouse mode, the user 502 may use the handheld controller 504 like a conventional computer mouse to interact with the 2D computer environment. 2D visual content may be displayed on, for example, a computer monitor 508 and/or a head-mounted display 510 worn by the user 502. When the user 502 desires to use the handheld controller 504 in a 3D computer environment, the user 502 may lift the handheld controller 504 off of the physical surface 506, and the handheld controller 504 may automatically switch to a multi-DOF mode. As noted above, alternatively, the user may make a selection (e.g., in a graphical user interface or by manipulating an input mechanism of the handheld controller 504 or of the head-mounted display 510, etc.) to switch between the multi-DOF mode and the mouse mode.

FIG. 6 is a flow diagram illustrating a method 600 of receiving user inputs in a computer environment (e.g., a 3D computer environment and/or a 2D computer environment), according to at least one embodiment of the present disclosure. At operation 610, data from a multi-DOF sensor module of a handheld controller may be received, such as to sense a position and a rotation (e.g., orientation) of the handheld controller. Operation 610 may be performed in a variety of ways. For example, the multi-DOF sensor module may include one or more accelerometers and/or gyroscopes that may generate data for sensing the position and/or rotation of the handheld controller. Such data may be transmitted to at least one processor, such as a processor configured to make computations for generating, manipulating, and/or interacting with a 3D computing environment (e.g., an artificial-reality environment).

At operation 620, a signal from a proximity sensor of the handheld controller may be received. Operation 620 may be performed in a variety of ways. For example, the proximity sensor may be positioned on a mouse module coupled to a controller body of the handheld controller. The signal received from the proximity sensor may indicate that the handheld controller is proximate to (e.g., against) a physical surface, such as a tabletop.

At operation 630, in response to receiving the signal from the proximity sensor, a multi-DOF sensor module may be deactivated and a mouse module may be activated. Operation 630 may be performed in a variety of ways. For example, upon receiving the signal from the proximity sensor indicating that the mouse module is proximate to or against a physical surface, a switch may deactivate the multi-DOF sensor module and may activate the mouse module for use in a 2D computing environment (e.g., a productivity environment). In some embodiments, a button signal from a button of the multi-DOF sensor module may be routed to a mouse click input of the mouse module.

At operation 640, data from a mouse sensor of the mouse module may be received to sense movement of the handheld controller relative to the physical surface. Operation 640 may be performed in a variety of ways. For example, after the mouse module is activated by the switch, the mouse module may generate data regarding a position and/or movement of the handheld controller relative to the physical surface. The data may be transmitted to a processor, such as a processor configured to make computations for generating, manipulating, and/or interacting with a 2D computing environment (e.g., a productivity environment). In some examples, the 2D computing environment may be embedded within a 3D computing environment, such as in a productivity application of an artificial-reality system.

In some embodiments, another signal from the proximity sensor, indicating that the handheld controller has been removed from its position proximate to the physical surface, may be received. In response to receiving this other signal, the mouse module may be deactivated and the multi-DOF sensor module may be activated. At this point, the handheld controller may again be used in a 3D computing environment using data from the multi-DOF sensor.

In some examples, the switching between a multi-DOF mode and a mouse mode may occur after a predetermined time (e.g., 0.5 seconds, 1 second, 2 seconds, etc.) from receiving the corresponding signal from the proximity sensor. Thus, lifting the handheld controller from a physical surface may not immediately deactivate the mouse module and activate the multi-DOF sensor module. Rather, the handheld controller may be lifted to reposition the mouse module on the physical surface, such as to move a cursor across a screen in multiple separate dragging movements, as with a typical computer mouse, without deactivating the mouse module and activating the multi-DOF sensor module. In some embodiments, the predetermined time for making the switch between the multi-DOF mode and the mouse mode may be configurable by the user. In some examples, placing the handheld controller against a physical surface may result in substantially immediate activation of the mouse module, while lifting the handheld controller from the physical surface may result in activation of the multi-DOF mode after the predetermined time.

Accordingly, handheld controllers for use in 3D computing environments of the present disclosure may include a mouse module that can be used in a 2D computing environment. The handheld controller may be configured to automatically or manually switch between use in a 3D computing environment and use in a 2D computing environment, for simple and intuitive use in the two different computing environments. Thus, embodiments of the present disclosure may be employed to facilitate the use of a single handheld controller in both 3D and 2D computing environments.

As noted above, embodiments of the present disclosure may include or be implemented in conjunction with various types of artificial-reality systems. Artificial-reality content may include video, audio, haptic feedback, or some combination thereof, any of which may be presented in a single channel or in multiple channels (such as stereo video that produces a 3D effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs), an example of which is augmented-reality system 700 in FIG. 7. Other artificial-reality systems may include an NED that also provides visibility into the real world (e.g., augmented-reality system 800 in FIG. 8) or that visually immerses a user in an artificial reality (e.g., virtual-reality system 900 in FIG. 9). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 7:
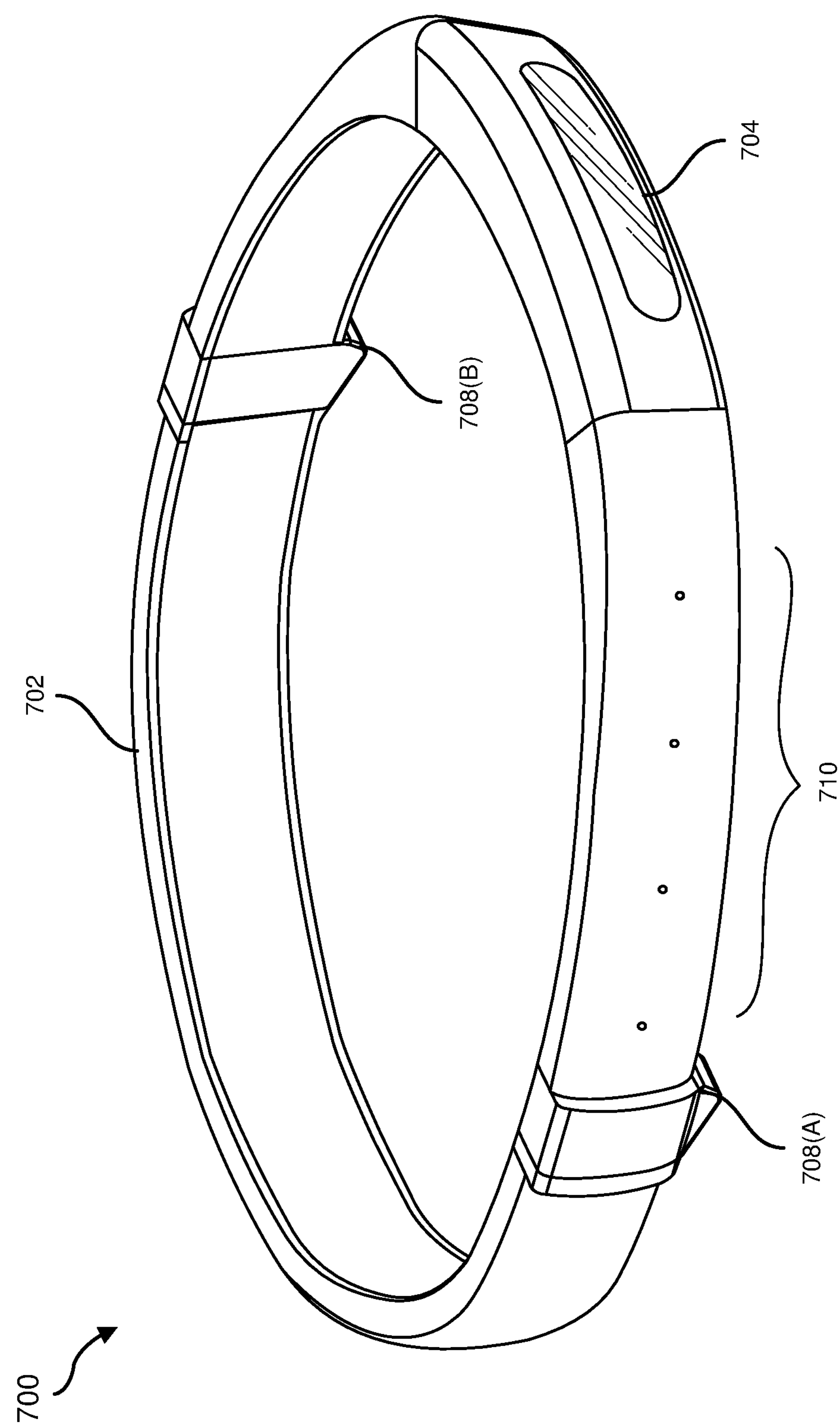
FIG. 7 is an illustration of an example artificial-reality headband that may be used in connection with embodiments of this disclosure.

Turning to FIG. 7, the augmented-reality system 700 generally represents a wearable device dimensioned to fit about a body part (e.g., a head) of a user. As shown in FIG. 7, the system 700 may include a frame 702 and a camera assembly 704 that is coupled to the frame 702 and configured to gather information about a local environment by observing the local environment. The augmented-reality system 700 may also include one or more audio devices, such as output audio transducers 708(A) and 708(B) and input audio transducers 710. The output audio transducers 708(A) and 708(B) may provide audio feedback and/or content to a user, and the input audio transducers 710 may capture audio in a user's environment.

As shown, the augmented-reality system 700 may not necessarily include an NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While the augmented-reality system 700 may not include an NED, augmented-reality system 700 may include other types of screens or visual feedback devices (e.g., a display screen integrated into a side of the frame 702).

Figure 8:
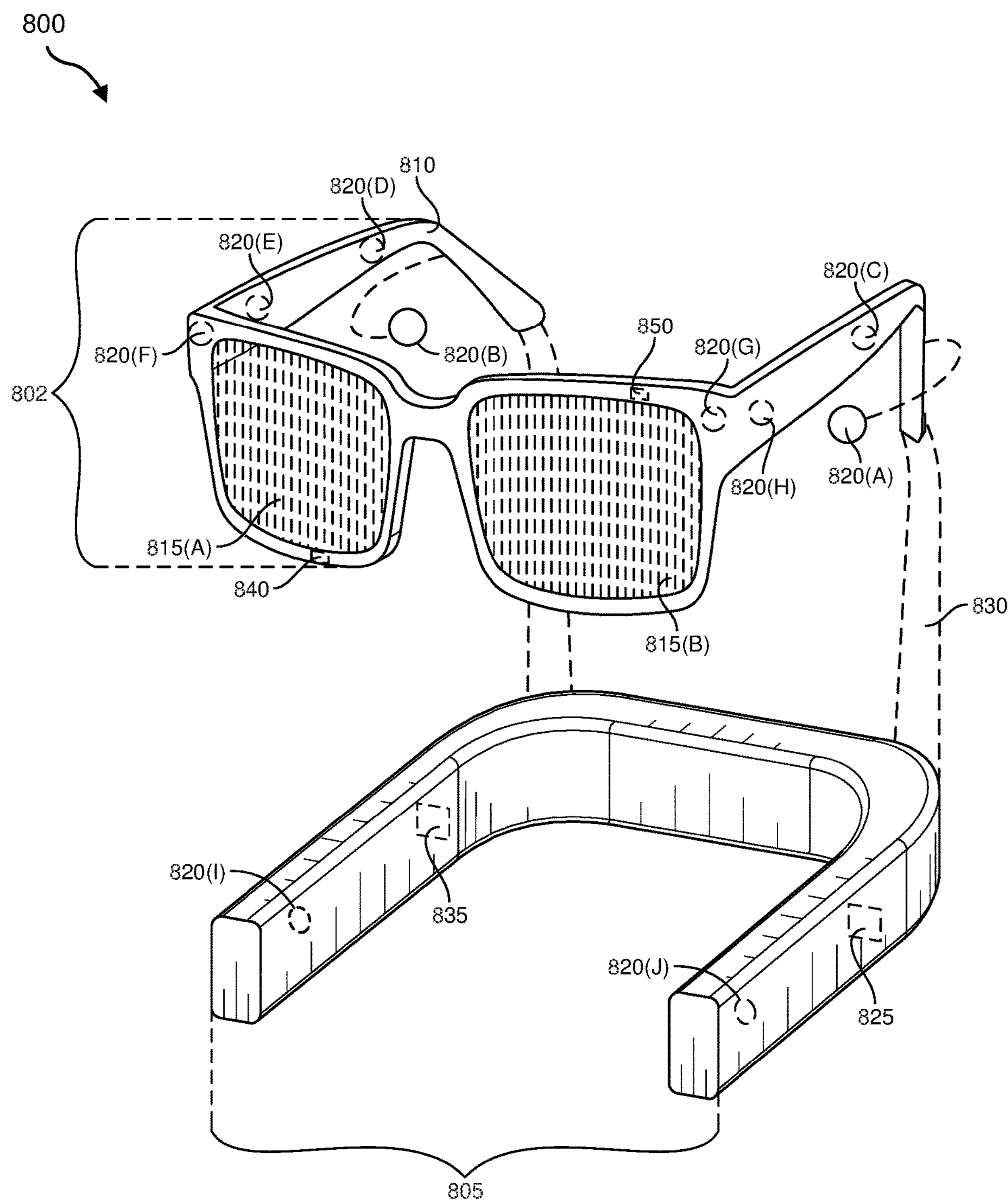
FIG. 8 is an illustration of example augmented-reality glasses that may be used in connection with embodiments of this disclosure.

The embodiments discussed in this disclosure may also be implemented in augmented-reality systems that include one or more NEDs. For example, as shown in FIG. 8, the augmented-reality system 800 may include an eyewear device 802 with a frame 810 configured to hold a left display device 815(A) and a right display device 815(B) in front of a user's eyes. The display devices 815(A) and 815(B) may act together or independently to present an image or series of images to a user. While the augmented-reality system 800 includes two displays, embodiments of this disclosure may be implemented in augmented-reality systems with a single NED or more than two NEDs.

In some embodiments, the augmented-reality system 800 may include one or more sensors, such as sensor 840. The sensor 840 may generate measurement signals in response to motion of the augmented-reality system 800 and may be located on substantially any portion of the frame 810. The sensor 840 may represent a position sensor, an inertial measurement unit (IMU), a depth camera assembly, or any combination thereof. In some embodiments, the augmented-reality system 800 may or may not include the sensor 840 or may include more than one sensor. In embodiments in which the sensor 840 includes an IMU, the IMU may generate calibration data based on measurement signals from the sensor 840. Examples of the sensor 840 may include, without limitation, accelerometers, gyroscopes, magnetometers, other suitable types of sensors that detect motion, sensors used for error correction of the IMU, or some combination thereof.

The augmented-reality system 800 may also include a microphone array with a plurality of acoustic transducers 820(A)-820(J), referred to collectively as acoustic transducers 820. The acoustic transducers 820 may be transducers that detect air pressure variations induced by sound waves. Each acoustic transducer 820 may be configured to detect sound and convert the detected sound into an electronic format (e.g., an analog or digital format). The microphone array in FIG. 8 may include, for example, ten acoustic transducers: 820(A) and 820(B), which may be designed to be placed inside a corresponding ear of the user, acoustic transducers 820(C), 820(D), 820(E), 820(F), 820(G), and 820(H), which may be positioned at various locations on the frame 810, and/or acoustic transducers 820(1) and 820(J), which may be positioned on a corresponding neckband 805.

In some embodiments, one or more of the acoustic transducers 820(A)-(F) may be used as output transducers (e.g., speakers). For example, the acoustic transducers 820(A) and/or 820(B) may be earbuds or any other suitable type of headphone or speaker.

The configuration of the acoustic transducers 820 of the microphone array may vary. While the augmented-reality system 800 is shown in FIG. 8 as having ten acoustic transducers 820, the number of acoustic transducers 820 may be greater or less than ten. In some embodiments, using higher numbers of acoustic transducers 820 may increase the amount of audio information collected and/or the sensitivity and accuracy of the audio information. In contrast, using a lower number of acoustic transducers 820 may decrease the computing power required by an associated controller 850 to process the collected audio information. In addition, the position of each acoustic transducer 820 of the microphone array may vary. For example, the position of an acoustic transducer 820 may include a defined position on the user, a defined coordinate on the frame 810, an orientation associated with each acoustic transducer 820, or some combination thereof.

The acoustic transducers 820(A) and 820(B) may be positioned on different parts of the user's ear, such as behind the pinna or within the auricle or fossa. Or, there may be additional acoustic transducers 820 on or surrounding the ear in addition to the acoustic transducers 820 inside the ear canal. Having an acoustic transducer 820 positioned next to an ear canal of a user may enable the microphone array to collect information on how sounds arrive at the ear canal. By positioning at least two of the acoustic transducers 820 on either side of a user's head (e.g., as binaural microphones), the augmented-reality device 800 may simulate binaural hearing and capture a 3D stereo sound field around about a user's head. In some embodiments, the acoustic transducers 820(A) and 820(B) may be connected to the augmented-reality system 800 via a wired connection 830, and in other embodiments, the acoustic transducers 820(A) and 820(B) may be connected to the augmented-reality system 800 via a wireless connection (e.g., a Bluetooth connection). In still other embodiments, the acoustic transducers 820(A) and 820(B) may not be used at all in conjunction with the augmented-reality system 800.

The acoustic transducers 820 on the frame 810 may be positioned along the length of the temples, across the bridge, above or below the display devices 815(A) and 815(B), or some combination thereof. The acoustic transducers 820 may be oriented such that the microphone array is able to detect sounds in a wide range of directions surrounding the user wearing the augmented-reality system 800. In some embodiments, an optimization process may be performed during manufacturing of the augmented-reality system 800 to determine relative positioning of each acoustic transducer 820 in the microphone array.

In some examples, the augmented-reality system 800 may include or be connected to an external device (e.g., a paired device), such as the neckband 805. The neckband 805 generally represents any type or form of paired device. Thus, the following discussion of the neckband 805 may also apply to various other paired devices, such as charging cases, smart watches, smart phones, wrist bands, other wearable devices, hand-held controllers, tablet computers, laptop computers and other external compute devices, etc.

As shown, the neckband 805 may be coupled to the eyewear device 802 via one or more connectors. The connectors may be wired or wireless and may include electrical and/or non-electrical (e.g., structural) components. In some cases, the eyewear device 802 and the neckband 805 may operate independently without any wired or wireless connection between them. While FIG. 8 illustrates the components of the eyewear device 802 and the neckband 805 in example locations on the eyewear device 802 and the neckband 805, the components may be located elsewhere and/or distributed differently on the eyewear device 802 and/or the neckband 805. In some embodiments, the components of the eyewear device 802 and the neckband 805 may be located on one or more additional peripheral devices paired with the eyewear device 802, the neckband 805, or some combination thereof.

Pairing external devices, such as the neckband 805, with augmented-reality eyewear devices may enable the eyewear devices to achieve the form factor of a pair of glasses while still providing sufficient battery and computation power for expanded capabilities. Some or all of the battery power, computational resources, and/or additional features of the augmented-reality system 800 may be provided by a paired device or shared between a paired device and an eyewear device, thus reducing the weight, heat profile, and form factor of the eyewear device overall while still retaining desired functionality. For example, the neckband 805 may allow components that would otherwise be included on an eyewear device to be included in the neckband 805 since users may tolerate a heavier weight load on their shoulders than they would tolerate on their heads. The neckband 805 may also have a larger surface area over which to diffuse and disperse heat to the ambient environment. Thus, the neckband 805 may allow for greater battery and computation capacity than might otherwise have been possible on a standalone eyewear device. Since weight carried in the neckband 805 may be less invasive to a user than weight carried in the eyewear device 802, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

The neckband 805 may be communicatively coupled with the eyewear device 802 and/or to other devices. These other devices may provide certain functions (e.g., tracking, localizing, depth mapping, processing, storage, etc.) to the augmented-reality system 800. In the embodiment of FIG. 8, the neckband 805 may include two acoustic transducers (e.g., 820(1) and 820(J)) that are part of the microphone array (or potentially form their own microphone subarray). The neckband 805 may also include a controller 825 and a power source 835.

The acoustic transducers 820(1) and 820(J) of the neckband 805 may be configured to detect sound and convert the detected sound into an electronic format (analog or digital). In the embodiment of FIG. 8, the acoustic transducers 820(1) and 820(J) may be positioned on the neckband 805, thereby increasing the distance between the neckband acoustic transducers 820(1) and 820(J) and other acoustic transducers 820 positioned on the eyewear device 802. In some cases, increasing the distance between the acoustic transducers 820 of the microphone array may improve the accuracy of beamforming performed via the microphone array. For example, if a sound is detected by the acoustic transducers 820(C) and 820(D) and the distance between the acoustic transducers 820(C) and 820(D) is greater than, e.g., the distance between the acoustic transducers 820(D) and 820(E), the determined source location of the detected sound may be more accurate than if the sound had been detected by the acoustic transducers 820(D) and 820(E).

The controller 825 of the neckband 805 may process information generated by the sensors on the neckband 805 and/or the augmented-reality system 800. For example, the controller 825 may process information from the microphone array that describes sounds detected by the microphone array. For each detected sound, the controller 825 may perform a direction-of-arrival (DOA) estimation to estimate a direction from which the detected sound arrived at the microphone array. As the microphone array detects sounds, the controller 825 may populate an audio data set with the information. In embodiments in which the augmented-reality system 800 includes an inertial measurement unit, the controller 825 may compute all inertial and spatial calculations from the IMU located on the eyewear device 802. A connector may convey information between the augmented-reality system 800 and the neckband 805 and between the augmented-reality system 800 and the controller 825. The information may be in the form of optical data, electrical data, wireless data, or any other transmittable data form. Moving the processing of information generated by the augmented-reality system 800 to the neckband 805 may reduce weight and heat in the eyewear device 802, making it more comfortable to the user.

The power source 835 in the neckband 805 may provide power to the eyewear device 802 and/or to the neckband 805. The power source 835 may include, without limitation, lithium ion batteries, lithium-polymer batteries, primary lithium batteries, alkaline batteries, or any other form of power storage. In some cases, the power source 835 may be a wired power source. Including the power source 835 on the neckband 805 instead of on the eyewear device 802 may help better distribute the weight and heat generated by the power source 835.

As noted, some artificial-reality systems may, instead of blending an artificial reality with actual reality, substantially replace one or more of a user's sensory perceptions of the real world with a virtual experience. One example of this type of system is a head-worn display system, such as the virtual-reality system 900 in FIG. 9, that mostly or completely covers a user's field of view. The virtual-reality system 900 may include a front rigid body 902 and a band 904 shaped to fit around a user's head. The virtual-reality system 900 may also include output audio transducers 906(A) and 906(B). Furthermore, while not shown in FIG. 9, the front rigid body 902 may include one or more electronic elements, including one or more electronic displays, one or more inertial measurement units (IMUS), one or more tracking emitters or detectors, and/or any other suitable device or system for creating an artificial reality experience.

Artificial-reality systems may include a variety of types of visual feedback mechanisms. For example, display devices in the augmented-reality system 800 and/or the virtual-reality system 900 may include one or more liquid crystal displays (LCDs), light-emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial-reality systems may include one or more projection systems. For example, display devices in the augmented-reality system 800 and/or the virtual-reality system 900 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. Artificial-reality systems may also be configured with any other suitable type or form of image projection system.

Artificial-reality systems may also include various types of computer vision components and subsystems. For example, the augmented-reality system 700, the augmented-reality system 800, and/or the virtual-reality system 900 may include one or more optical sensors, such as 2D or 3D cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIGS. 7 and 9, the output audio transducers 708(A), 708(B), 906(A), and 906(B) may include voice coil speakers, ribbon speakers, electrostatic speakers, piezoelectric speakers, bone conduction transducers, cartilage conduction transducers, and/or any other suitable type or form of audio transducer. Similarly, the input audio transducers

710 may include condenser microphones, dynamic microphones, ribbon microphones, and/or any other type or form of input transducer. In some embodiments, a single transducer may be used for both audio input and audio output.

Figure 9:
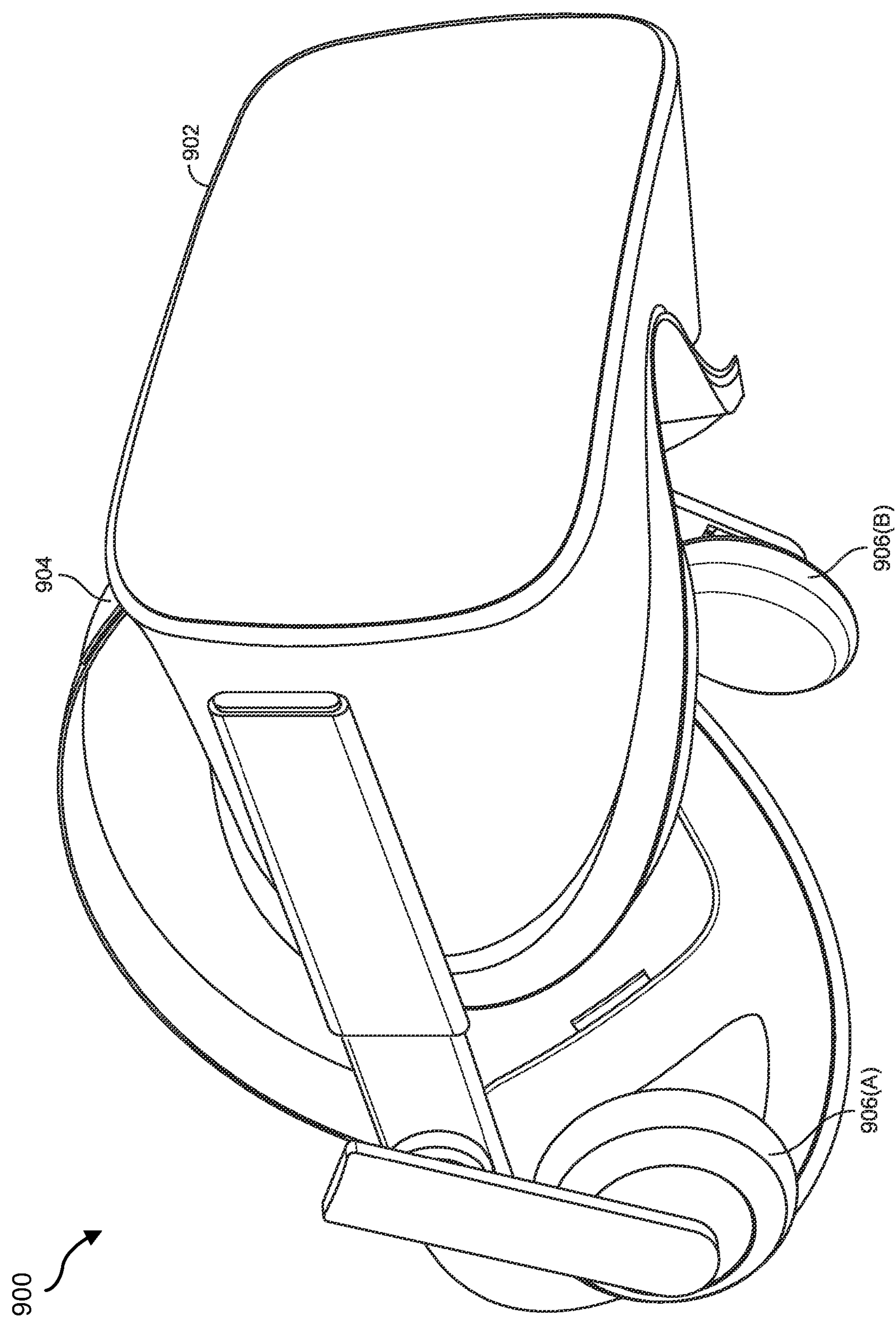
FIG. 9 is an illustration of an example virtual-reality headset that may be used in connection with embodiments of this disclosure.

While not shown in FIGS. 7-9, artificial-reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial-reality experience in one or more of these contexts and environments and/or in other contexts and environments.

As noted, the artificial-reality systems 700, 800, and 900 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 10:
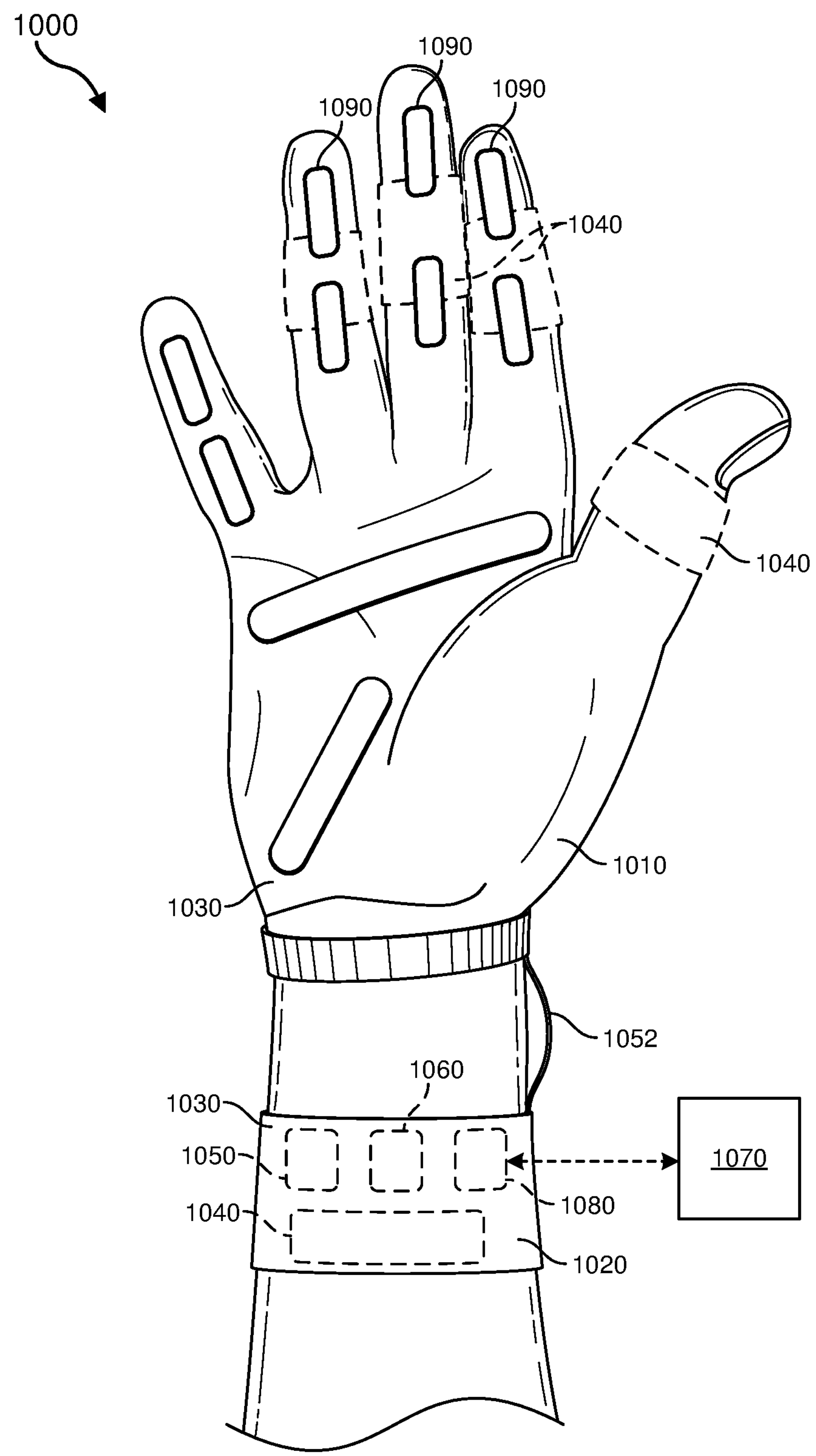
FIG. 10 is an illustration of example haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 10 illustrates a vibrotactile system 1000 in the form of a wearable glove (haptic device 1010) and wristband (haptic device 1020). The haptic device 1010 and the haptic device 1020 are shown as examples of wearable devices that include a flexible, wearable textile material 1030 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1040 may be positioned at least partially within one or more corresponding pockets formed in the textile material 1030 of the vibrotactile system 1000. The vibrotactile devices 1040 may be positioned in locations to provide a vibrating sensation (e.g., haptic feedback) to a user of the vibrotactile system 1000. For example, the vibrotactile devices 1040 may be positioned to be against the user's finger(s), thumb, or wrist, as shown in FIG. 10. The vibrotactile devices 1040 may, in some examples, be sufficiently flexible to conform to or bend with the user's corresponding body part(s).

A power source 1050 (e.g., a battery) for applying a voltage to the vibrotactile devices 1040 for activation thereof may be electrically coupled to the vibrotactile devices 1040, such as via conductive wiring 1052. In some examples, each of the vibrotactile devices 1040 may be independently electrically coupled to the power source 1050 for individual activation. In some embodiments, a processor 1060 may be operatively coupled to the power source 1050 and configured (e.g., programmed) to control activation of the vibrotactile devices 1040.

The vibrotactile system 1000 may be implemented in a variety of ways. In some examples, the vibrotactile system 1000 may be a standalone system with integral subsystems and components for operation independent of other devices and systems. As another example, the vibrotactile system 1000 may be configured for interaction with another device or system 1070. For example, the vibrotactile system 1000 may, in some examples, include a communications interface 1080 for receiving and/or sending signals to the other device or system 1070. The other device or system 1070 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. The communications interface 1080 may enable communications between the vibrotactile system 1000 and the other device or system 1070 via a wireless (e.g., Wi-Fi, Bluetooth, cellular, radio, etc.) link or a wired link. If present, the communications interface 1080 may be in communication with the processor 1060, such as to provide a signal to the processor 1060 to activate or deactivate one or more of the vibrotactile devices 1040.

The vibrotactile system 1000 may optionally include other subsystems and components, such as touch-sensitive pads 1090, pressure sensors, motion sensors, position sensors, lighting elements, and/or user interface elements (e.g., an on/off button, a vibration control element, etc.). During use, the vibrotactile devices 1040 may be configured to be activated for a variety of different reasons, such as in response to the user's interaction with user interface elements, a signal from the motion or position sensors, a signal from the touch-sensitive pads 1090, a signal from the pressure sensors, a signal from the other device or system 1070, etc.

Although the power source 1050, the processor 1060, and the communications interface 1080 are illustrated in FIG. 10 as being positioned in the haptic device 1020, the present disclosure is not so limited. For example, one or more of the power source 1050, the processor 1060, or the communications interface 1080 may be positioned within the haptic device 1010 or within another wearable textile.

Figure 11:
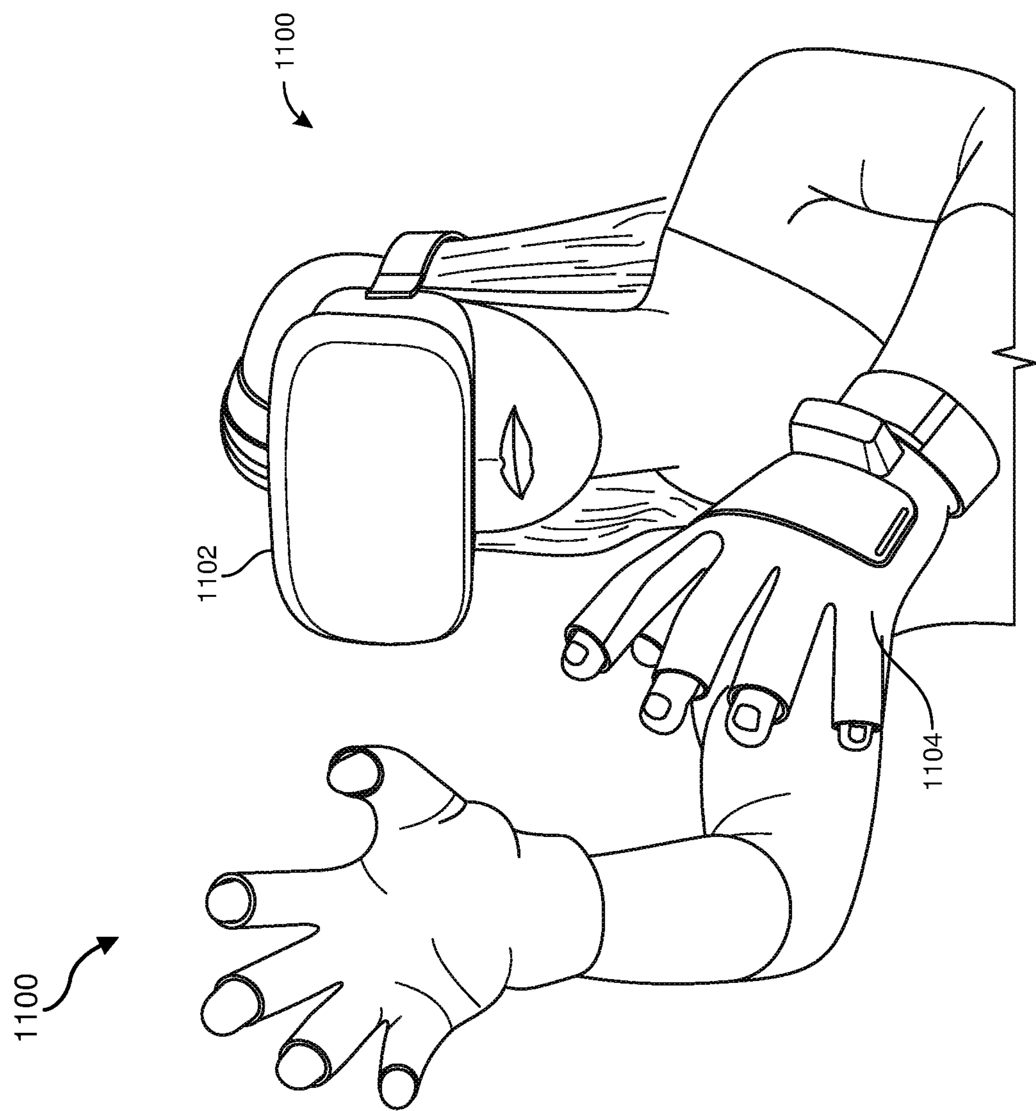
FIG. 11 is an illustration of an example virtual-reality environment according to embodiments of this disclosure.

Haptic wearables, such as those shown in and described in connection with FIG. 10, may be implemented in a variety of types of artificial-reality systems and environments. FIG. 11 shows an example artificial-reality environment 1100 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Head-mounted display 1102 generally represents any type or form of virtual-reality system, such as the virtual-reality system 900 in FIG. 9. Haptic device 1104 generally represents any type or form of wearable device, worn by a use of an artificial-reality system, that provides haptic feedback to the user to give the user the perception that he or she is physically engaging with a virtual object. In some embodiments, the haptic device 1104 may provide haptic feedback by applying vibration, motion, and/or force to the user. For example, the haptic device 1104 may limit or augment a user's movement. To give a specific example, the haptic device 1104 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use the haptic device 1104 to send action requests to a console. Examples of action requests include, without limitation, requests to start an application and/or end the application and/or requests to perform a particular action within the application.

Figure 12:
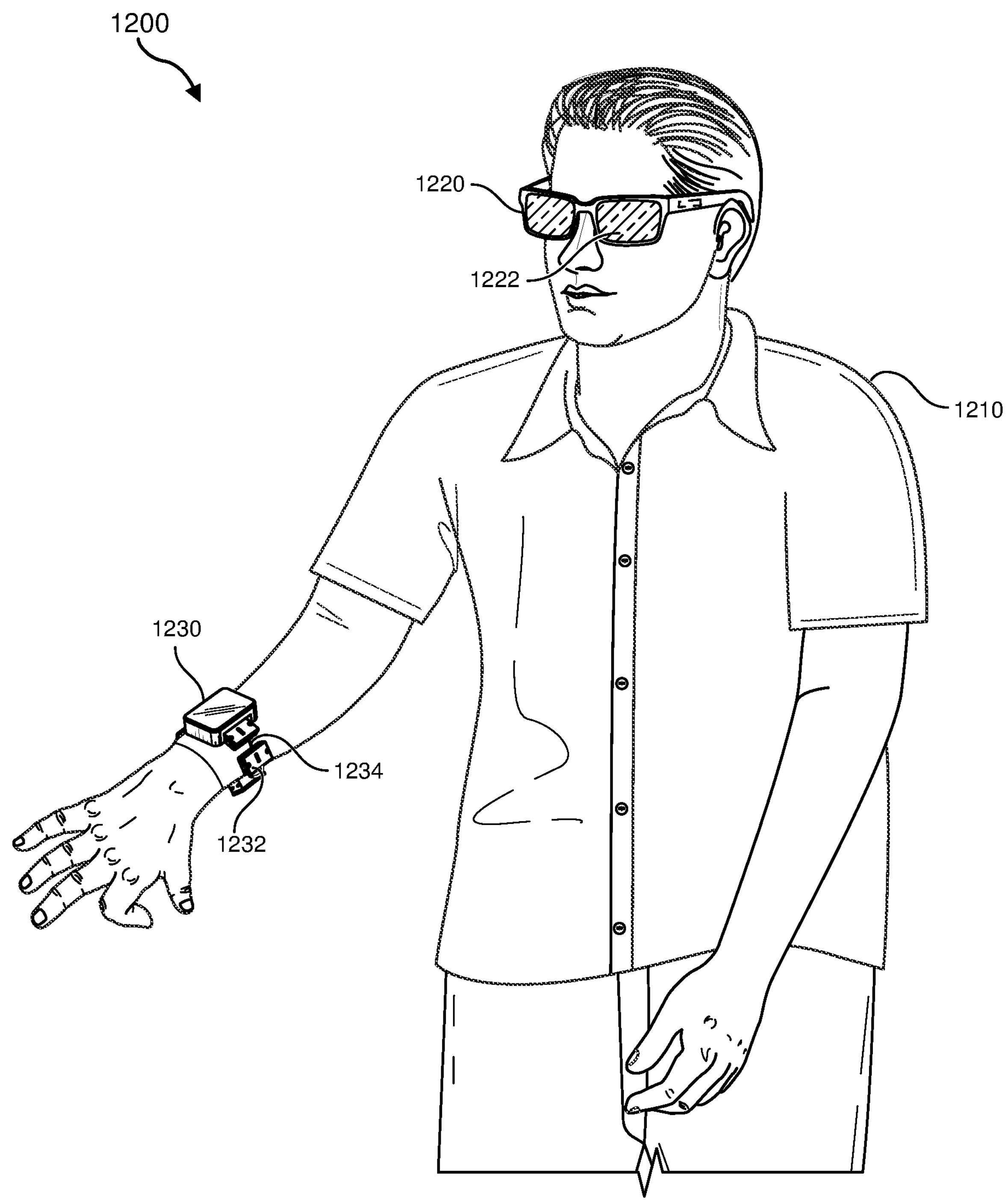
FIG. 12 is an illustration of an example augmented-reality environment according to embodiments of this disclosure.

While haptic interfaces may be used with virtual-reality systems, as shown in FIG. 11, haptic interfaces may also be used with augmented-reality systems, as shown in FIG. 12. FIG. 12 is a perspective view a user 1210 interacting with an augmented-reality system 1200. In this example, the user 1210 may wear a pair of augmented-reality glasses 1220 that have one or more displays 1222 and that are paired with a haptic device 1230. The haptic device 1230 may be a wristband that includes a plurality of band elements 1232 and a tensioning mechanism 1234 that connects band elements 1232 to one another.

One or more of the band elements 1232 may include any type or form of actuator suitable for providing haptic feedback. For example, one or more of the band elements 1232 may be configured to provide one or more of various types of cutaneous feedback, including vibration, force, traction, texture, and/or temperature. To provide such feedback, the band elements 1232 may include one or more of various types of actuators. In one example, each of the band elements 1232 may include a vibrotactor (e.g., a vibrotactile actuator) configured to vibrate in unison or independently to provide one or more of various types of haptic sensations to a user. Alternatively, only a single band element or a subset of band elements may include vibrotactors.

The haptic devices 1010, 1020, 1104, and 1230 may include any suitable number and/or type of haptic transducer, sensor, and/or feedback mechanism. For example, the haptic devices 1010, 1020, 1104, and 1230 may include one or more mechanical transducers, piezoelectric transducers, and/or fluidic transducers. The haptic devices 1010, 1020, 1104, and 1230 may also include various combinations of different types and forms of transducers that work together or independently to enhance a user's artificial-reality experience. In one example, each of the band elements 1232 of the haptic device 1230 may include a vibrotactor (e.g., a vibrotactile actuator) configured to vibrate in unison or independently to provide one or more of various types of haptic sensations to a user.

By way of non-limiting examples, the following embodiments are included in the present disclosure.

Example 1: A handheld controller, which may include: a multi-degree of freedom sensor module configured for sensing a position and orientation of the handheld controller; a mouse module, including: a mouse sensor configured for sensing a movement of the handheld controller relative to a physical surface; and a proximity sensor configured for sensing when the mouse sensor is proximate to the physical surface; and a switch configured to activate the mouse sensor and deactivate the multi-degree of freedom sensor module when the proximity sensor indicates that the mouse sensor is proximate to the physical surface and to deactivate the mouse sensor and activate the multi-degree of freedom sensor module when the proximity sensor indicates that the mouse sensor is not proximate to the physical surface.

Example 2: The handheld controller of Example 1, further including: at least a first button and a second button configured as user inputs when the multi-degree of freedom sensor module is activated, wherein the switch is further configured to route button signals from the first button and the second button to left-click and right-click inputs of the mouse module when the mouse sensor is activated.

Example 3: The handheld controller of Example 1 or Example 2, further including a handle shaped and sized for gripping the handheld controller.

Example 4: The handheld controller of Example 3, wherein the mouse module is removable and replaceable relative to the handle.

Example 5: The handheld controller of Example 4, further including an electronics interface configured for forming a communication connection between the mouse module and the multi-degree of freedom sensor module.

Example 6: The handheld controller of any of Examples 3 through 5, wherein the mouse module further includes a platform shaped and configured to rest against the physical surface when the mouse sensor is proximate to the physical surface.

Example 7: The handheld controller of Example 6, wherein the platform is shaped, positioned, and sized to support at least a portion of the handheld controller on the physical surface and to maintain the mouse sensor proximate to the physical surface when the handheld controller is not held by a user.

Example 8: The handheld controller of Example 6 or Example 7, wherein the platform is shaped and positioned to form a gap between the platform and the handle, such that at least a portion of one or more of a user's fingers are positioned within the gap when the handle is gripped by the user.

Example 9: The handheld controller of any of Examples 6 through 8, wherein the platform includes at least one planar surface positioned to rest against the physical surface when the mouse sensor is activated.

Example 10: The handheld controller of any of Examples 1 through 9, wherein the mouse module further includes a scroll wheel positioned to be manipulated by a thumb of a user when the handheld controller is held by the user.

Example 11: An artificial-reality controller, which may include: a multi-degree of freedom sensor module configured for sensing a position and orientation of the artificial-reality controller for use in a three-dimensional artificial-reality environment; a mouse module comprising a mouse sensor configured for sensing movement of the artificial-reality controller relative to a physical surface for use in a two-dimensional computing environment;

and a switch configured to alternate the artificial-reality controller between a multi-degree of freedom mode that utilizes data from the multi-degree of freedom sensor module and a mouse mode that utilizes data from the mouse module.

Example 12: The artificial-reality controller of Example 11, wherein the switch is configured to alternate the artificial-reality controller between the multi-degree of freedom mode and the mouse mode in response to a user input.

Example 13: The artificial-reality controller of Example 12, wherein the user input includes at least one of: manipulation of a mechanical input mechanism by a user; placement of the artificial-reality controller against a physical surface; or removal of the artificial-reality controller from a position against the physical surface.

Example 14: The artificial-reality controller of any of Examples 11 through 13, wherein the mouse module further includes a proximity sensor and the switch is configured to alternate between the multi-degree of freedom mode and the mouse mode in response to a signal from the proximity sensor.

Example 15: The artificial-reality controller of Example 14, wherein the proximity sensor includes an optical proximity sensor.

Example 16: The artificial-reality controller of any of Examples 11 through 15, wherein the mouse sensor includes an optical mouse sensor.

Example 17: The artificial-reality controller of any of Examples 11 through 16, further including a wireless communication module configured to provide data from the multi-degree of freedom sensor module and from the mouse module to at least one processor configured for controlling the three-dimensional artificial-reality environment and the two-dimensional computing environment.

Example 18: A method of receiving user inputs in a computer environment, in which the method may include: receiving data from a multi-degree of freedom sensor module of a handheld controller to sense a position and orientation of the handheld controller; receiving a signal from a proximity sensor indicating that the handheld controller is proximate to a physical surface; in response to receiving the signal from the proximity sensor, deactivating the multi-degree of freedom sensor module and activating a mouse module; and in response to the activation of the mouse module, receiving data from a mouse sensor of the mouse module to sense movement of the handheld controller relative to the physical surface.

Example 19: The method of Example 18, further including: receiving another signal from the proximity sensor, indicating that the handheld controller has been removed from its position proximate to the physical surface; and in response to receiving the other signal from the proximity sensor, deactivating the mouse module and activating the multi-degree of freedom sensor module.

Example 20: The method of Example 18 or Example 19, further including, in response to the activation of the mouse module, routing a button signal from a button of the multi-degree of freedom sensor module to a mouse click input of the mouse module.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A handheld controller, comprising:
- a handle shaped and sized for gripping the handheld controller;
- a multi-degree of freedom sensor module configured for sensing a position and orientation of the handheld controller; and
- a mouse module, comprising:
  - a mouse sensor configured for sensing movement of the handheld controller relative to a physical surface; and
  - a platform shaped and configured to rest against the physical surface when the mouse sensor is proximate to the physical surface, wherein the platform is shaped and positioned to form a gap directly between the platform and the handle, such that at least a portion of one or more of a user's fingers is positioned within the gap when the handle is gripped by the user.

2. The handheld controller of claim 1, wherein the mouse module further comprises a proximity sensor for sensing when the mouse sensor is proximate to the physical surface.

3. The handheld controller of claim 1, wherein the multi-degree of freedom sensor module comprises at least a six-degree of freedom sensor.

4. The handheld controller of claim 1, further comprising infrared light sources for optically tracking the handheld controller in space.

5. The handheld controller of claim 1, further comprising a scroll wheel positioned on a side of the mouse module.

6. The handheld controller of claim 1, further comprising at least one of:
- an input thumbstick;
- at least one input button; or
- at least one input trigger.

7. The handheld controller of claim 1, wherein the platform comprises at least one planar surface shaped and sized for resting against the physical surface.

8. The handheld controller of claim 1, further comprising a switch that is configured for alternating the handheld controller between a mouse mode in which the mouse sensor is active and a multi-degree of freedom mode in which the multi-degree of freedom sensor module is active.

9. The handheld controller of claim 8, wherein the switch alternates the handheld controller between the mouse mode and the multi-degree of freedom mode in response to the mouse module being placed against the physical surface or being moved away from the physical surface.

10. The handheld controller of claim 8, further comprising at least one input button, wherein the input button is configured to provide a mouse click input when the handheld controller is in the mouse mode.

11. A mouse module for a handheld controller, comprising:

a coupling mechanism configured for coupling the mouse module to a body of a handheld controller;

a mouse sensor configured for sensing movement of the mouse module relative to a physical surface; and a platform shaped and configured to rest against a physical surface when the mouse sensor is proximate to the physical surface, wherein the platform is positioned relative to the coupling mechanism to form a gap between the platform and the body of the handheld controller when the mouse module is coupled to the body of the handheld controller, wherein the gap is sized to position a user's fingers within the gap when the body is gripped by the user.

12. The mouse module of claim 11, further comprising an electronics interface configured for forming a communication connection between the mouse module and the handheld controller when the mouse module is coupled to the body of the handheld controller.

13. The mouse module of claim 12, wherein the electronics interface comprises a wireless connection or a wired connection.

14. The mouse module of claim 12, wherein the electronics interface is configured to couple the mouse sensor to a power source in the handheld controller.

15. The mouse module of claim 12, wherein the electronics interface is configured to transmit data from the mouse sensor to the handheld controller when the mouse module is coupled to the body of the handheld controller.

16. The mouse module of claim 11, wherein the coupling mechanism comprises at least one of:

a clip;

a magnet;

a compliant mechanism;

a bolt;

a screw; or an adhesive.

17. The mouse module of claim 11, further comprising a proximity sensor configured to sense when the mouse sensor is near or against the physical surface.

18. The mouse module of claim 17, wherein the proximity sensor comprises at least one of:

an optical sensor;

a capacitive sensor;

a Hall effect sensor; or a magnetic sensor.

19. The mouse module of claim 11, wherein the platform has a non-linear shape configured to provide a stable foundation for supporting the mouse module and the handheld controller on the physical surface when the mouse module is coupled to the handheld controller by the coupling mechanism.

20. An artificial-reality system, comprising:

a head-mounted display operated with at least one processor; and a handheld controller, comprising:

a handle shaped and sized for gripping the handheld controller; and a mouse module, comprising:

a mouse sensor configured for sensing movement of the handheld controller relative to a physical surface; and a platform shaped and configured to rest against the physical surface when the mouse sensor is proximate to the physical surface, wherein the platform is positioned to form a gap directly between the platform and the handle, such that at least a portion of one or more of a user's fingers is positioned within the gap when the handle is gripped by the user, wherein the handheld controller is in communication with the at least one processor for transmitting data from the mouse sensor to the at least one processor.

* * * * *